United States Patent Office 3,475,400
Patented Oct. 28, 1969

3,475,400
DYE RECEPTIVE TEXTILE FIBERS, FILMS, SHAPED ARTICLES AND THE LIKE COMPRISING SYNTHETIC POLYMERS, AND METHOD FOR PREPARING SAME
Luciano Tavoletti, Terni, Italy, assignor to Montecatini Edison S.p.A., Milan, Italy
No Drawing. Filed Nov. 8, 1966, Ser. No. 592,715
Claims priority, application Italy, Nov. 10, 1965,
24,894/65
Int. Cl. C08f 29/02
U.S. Cl. 260—93.7    6 Claims

ABSTRACT OF THE DISCLOSURE

The present invention relates to the preparation of textile fibers, films, tapes, shaped articles and the like, from compositions comprising synthetic polymers which compositions are particularly receptive to disperse dyestuffs and to chelating dyestuffs. The compositions of the present invention comprise polyolefins which contain admixed therein new additives which render the polyolefin dye receptive without reducing the heat stability thereof, said additives being metal complexes of Mannich bases of the formula:

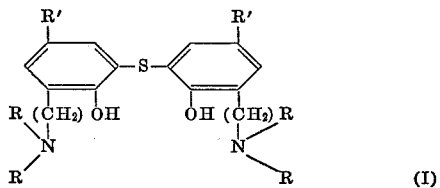

wherein R is an alkyl radical having 1 to 8 carbon atoms and R' is H or an alkyl radical having 1 to 12 carbon atoms.

BRIEF SUMMARY OF THE INVENTION

More particularly, the present invention relates to the preparation of dyeable textile fibers by extrusion of mixes of synthetic polymers with metal complexes of metals of Groups II-B and VIII of the Periodic Table with Mannich bases of phenol sulfides having the formula:

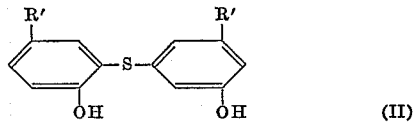

wherein R' is an alkyl radical of a hydrogen atom.

The synthetic polymers used in the present invention include crystalline polyolefins obtained by low-pressure polymerization with stereospecific catalysts. A preferred crystalline polyolefin is polypropylene essentially consisting of isotactic macromolecules. Also suitable for use in the present invention are polyolefins obtained from monomers of the formula R—CH=CH$_2$, wherein R is H or an alkyl or aryl radical, for example, polyethylene, polybutene-1, poly-4-methylpentene-1, polystyrene and the like.

Prior proposals are known wherein methods are described for modifying the dye receptivity of polypropylene and similar polyolefin fibers by addition to the polymer, before spinning, of various substances which serve to modify the dyeability of the fibers. One such prior proposal is to add to the polyolefins phenol sulfide derivatives of metals of Group II-B of the Periodic Table, which derivatives have two —OH radicals bound to the aromatic nucleous in a position ortho to the sulfur atom. Proposals are also known for the addition of nickel or other metal derivatives of phenol sulfides to polyolefins.

The addition of such compounds to polyolefins renders the fibers receptive to dyestuffs, more particularly to those of the chelating classes. The addition to the polyolefins of the metal derivatives of phenol sulfides in accordance with these prior proposals, however, sometimes has the undesirable side-effect of a certain tendency to thermal degradation of the mixtures. This tendency can be shown by carrying out determinations of melt index on the mixtures after subjecting them to thermal treatments for successive times.

DETAILED DESCRIPTION

It has now surprisingly been found that if metal complexes of the Mannich bases of phenol sulfides, having the general formula:

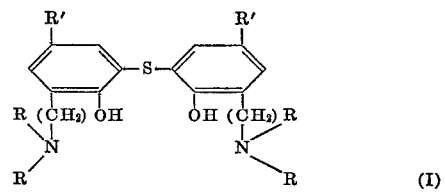

wherein R is an alkyl radical having 1 to 8 carbon atoms and R' is an alkyl radical having 1 to 12 carbon atoms or a hydrogen atom, are added to polyolefins, the said derivatives render the resulting fibers or other materials produced therefrom receptive to disperse dyestuffs and to dyestuffs of the chelating classes (e.g. National Polypropylene, Olefin, Aizen, Daito, etc.) without causing the thermal degradation of the resulting mixtures.

The synthesis of the compounds used as tinctorial modifiers in the present invention can be summarized as follows:

(1) preparing the Mannich bases of phenol sulfides, and then
(2) complexing the Mannich bases with metal salts.

The preparation of Mannich bases of phenol sulfides was carried out as described by A. M. Kuliev et coll. Azerb. Kin. Zhur, n. 5 63, (1962), by dissolving phenol sulfide, having the —OH radicals ortho to the sulfur atom, in a suitable solvent, then adding a secondary amine having the formula R—NH—R, wherein R is as defined above in connection with Formula I, subsequently adding aqueous formaldehyde solution and finally refluxing the mixture.

The complexing with metal salts was carried out by reacting the Mannich bases of phenol sulfides with an organic salt (formate, acetate, propionate) or an inorganic salt (chloride, nitrate, sulfate) of a metal of Groups II-B (Zn or Cd) and VIII (Fe, Ni or Co) of the Periodic Table (or of other metals capable of forming complexes such as Cr, Cu, Fe, Sn, Sr or Ti), preferably in the presence of solvent (such as methanol, ethanol, isopropanol, butanol, benzene, xylene, toluene etc.). The reaction can be carried out by heating the reactants.

Non limiting examples of metal salt are zinc chloride, nickel chloride hexahydrate, nickel acetate tetrahydrate, zinc acetate dihydrate, cadmium chloride, cadmium acetate etc.

The metal complexes of the present invention are generally added to the polyolefins in proportions of about 0.1–10% by weight based on the total weight of the mixture. The addition of the metal complexes to the polymer is generally carried out by simply mixing the metal complex, while agitating, with the polymer.

It is also possible to carry out the addition by other methods, such as by mixing the polymers with a solution of the metal compound in a suitable solvent, followed by evaporation of the solvent, or by addition of the metal complex to the polymer at the end of the polymerization. The metal complex may also be applied to the manufactured article, e.g., by immersing the article in a solution or dispersion of the metal complex and then evaporating the solvent. The application can be made before or after the stretching of the yarns, for times varying from a few seconds to some hours, more particularly from about 10 seconds to about 3 hrs, at a temperature varying from room temperature to 10° C. below the softening point of the base polymer.

The mixes are preferably granulated and then extruded with melt spinning devices, preferably of the type described in Italian Patent No. 600,248 having a length/diameter ratio higher than 1. The granulation and spinning of the mixes are carried out by operating in the absence of oxygen, preferably under an inert gas atmosphere (e.g., nitrogen).

The spinning is conveniently carried out in the presence of small amounts of a "solid dispersing agent" (such as cetyl alcohol, stearic acid, stearamide, polystearamide, and the condensation products of ethylene oxide with alcohols, phenols or amines), according to Italian Patent No. 608,856. In addition to the metal complexes of the present invention, opacifiers and organic or inorganic dyeing pigments can also be added to the polymers during the mixing.

After spinning, the fibers can be subjected to a stretching process, with stretching ratios between 1:2 and 1:10, at temperatures of 80-150° C. in stretching devices heated with hot air or steam of with a similar fluid, or provided with a heating plate.

The fibers can then be subjected to a dimentional stabilization treatment, under conditions which either permit or prevent shrinking, at temperatures of 80-160° C., as described in Italian Patents Nos. 566,914 and 588,318.

The fibers obtained by extrusion of the mixes of the present invention can be mono- or plurifilaments and can be used for preparing continuous yarns or staple or for preparing bulky yarns or staple.

The compositions of the present invention can be used not only for preparing yarns but also for preparing films, tapes, shaped articles and the like.

The fibers and other articles of the present invention have a remarkable receptivity for disperse dyestuffs and chelating dyestuffs and do not exhibit thermal decomposition effects.

The procedures described below were employed to determine several characteristics of the compositions of the present invention.

1. Determination of melt index

The measurements were carried out according to ASTM 1238-57, at a temperature of 230° C. and with a weight of 2,160 g., on laminae 1 mm. thick, consisting of polypropylene mixed with the additive in such amount that the final mixture had a metal content of 0.1%.

The laminae were subjected to the measurement either immediately after shaping (at 280° C.) or after staying at 300° C. for 15 minutes and then at 280° C. for 15 minutes in a Carver press.

2. Dyeing methods and dyestuffs (a) *Purging.*—The fibers were purged with a solution of the sodium salt of oleyl-methyltaurinic acid (2 g./l.) and sodium carbonate (1 g./l.), at 60° C., for 20-30 minutes; they were then carfully rinsed with running water.

(b) *Chelating dyestuffs* ("Olefin", "National polypropylene" classes).—The dyestuffs were prepared by kneading them with an equal weight amount of a 10% of a solution of the condensation producet of ethylene oxide with aliphatic alcohol. Then warm water was added and the volume adjusted.

The dyeings were carried out with a fiber/bath ratio of 1:30. Water was heated to 40° C., whereupon 6% of Dispergal O and 2% (by weight of the fiber) of a 56% acetic acid solution were added so as to produce a pH of 3.5-4. At this point the fibers were immersed in the bath and, after 15-20 minutes, the solution of the chelating dyestuff of the "Olefin" or "National polypropylene" classes (obtained as above described), was added and the resulting mixture heated to the boiling point during 45 minutes. Boiling was continued for 60-90 minutes. The dyed fibers were washed with a 2% solution of Dispergal O for 20 minutes at 95° C. and were then rinsed with running water having a temperature of about 18 to 25° C:

(c) *Chelating dyestuffs* ("Aizen", "Daito" classes).— The dyestuffs were prepared by kneading them with an equal weight amount of a 10% solution of PK salt K (Daito Chem., Co. Ltd.). The volume was then adjusted by warm water (40° C.) addition, so as to contain 0.5% by weight of dyestuff.

The dye bath particulars were as follows:

Dyestuff:
  Desired percent (depends upon the shades desired, but is usually comprised between 0.1 and 10% by weight of the fibre)
PK Salt K: 1 g./l.
Bath ratio: 1.50
pH: Neutral or weakly acid (pH 3 to 7, preferably 4)

The fibers were immersed in the bath which was then heated to the boiling point within 40-45 minutes. The bath was then kept at the boiling point for 60-90 minutes. The dyed fibers were repeatedly rinsed with warm water and were subjected to a reducing treatment and then rinsed again with water.

The composition of the reducing treatment bath and the treatment condition were as follows:

| | |
|---|---|
| $Na_2S_2O_4 \cdot 2H_2O$ | 1.5 g./l. |
| Sodium carbonate | 1 g./l. |
| Pelepon S-4 (Joshimura Jukagaki Co.) | 1 g./l. |
| Bath ratio | 1:50 |
| Temperature | 80° C. |
| Time | 30 minutes. |

(d) *Disperse dyestuffs.*—The dyeings were carried out with a fiber/bath ratio of 1:30. Water was heated to 40° C., the fiber introduced, the dispersion of dyestuff in water (prepared as described in item (b)) then added and the bath heated to the boiling point. The fibers were dyed for 60 minutes at the boiling point. The dyed fibers were washed with a solution containing 1 cc./l. of an oxyethylate of alkylphenol, for 20 minutes at 40° C. and then with running water.

The following examples are presented to further illustrate the invention without limiting its scope.

EXAMPLE 1

38 g. (0.086 mol) of 2,2'-thiobis(4-tert.octyl)phenol were dissolved in 100 cc. of ethanol while slightly heating to about 45 to 50° C. The solution was cooled to room temperature and 31.5 g. (0.43 mol) of diethylamine and, over 10 minutes, 32 g. of a 40% aqueous formaldehyde solution were added.

After refluxing for 4 hours, the solution was dried under vacuum and the residual oil solidified.

By crystallization from a methanol acetone 60:40 by vol. solution (for each gram of product were used 10 ml. of solution), crystals of 2,2'-thiobis(4-tert.octyl-6-diethylaminomethyl)phenol having a melting point of 112-114° C. were obtained.

Analysis showed: Nitrogen (found)=4.6% (calculated for $C_{38}H_{64}N_2O_2S$=4.58%). Sulfur (found)=5.0% (calculated for $C_{38}H_{64}N_2O_2S$=5.25%).

6.12 g. of 2,2'-thiobis(4-tert.octyl-6-diethylaminomethyl)phenol were dissolved in 100 cc. of warm methanol (having a temperature comprised between 40° C. and the boiling temperature). Then 2.2 g. of zinc acetate dihydrate dissolved in 25 cc. of methanol were added and the mixture refluxed for 2 hours.

100 cc. of xylene were then added and the mixture then distilled until a dry residue was obtained. The solid residue was carefully washed with methanol, filtered and dried. 5 g. of an ivory-white solid, insoluble in methanol and ethanol and soluble in benzene, n-heptane, petroleum ether and ethylether, were obtained.

The product was found to contain 9.8% of Zn (calculated for $C_{38}H_{62}N_2O_2SZn=9.65\%$).

1 g. of the zinc derivative of 2,2'-thiobis(4-tert.octyl-6-diethylaminomethyl)phenol was mixed in a ball mill with 99 g. of polypropylene having a specific viscosity [η] of 1.42 (determined in tetrahydronaphthalene at 135° C.), a residue after heptane extraction of 97% and an ash content of 0.012%. The mix was then spun at 250° C. with a laboratory device consisting of a heated cylinder, piston and spinneret with 4 holes having a ratio φ/length of 0.8 mm./16 mm. Intense solid colors were obtained by dyeing the fibers with the following dyestuffs:

Violet polypropylene 3 BRM
Orange olefin 2532
Red Aizen 3 BL
Violet Aizen RL
Yellow Daito HRK

EXAMPLE 2

6.12 g. of 2,2'-thiobis(4-tert.octyl-6-diethylaminomethyl)phenol, 2.5 g. of nickel acetate tetrahydrate and 150 cc. of xylene were heated to 120–125° C. until no more acetic acid distilled off. After complete evaporation, the solid residue was carefully washed with methanol, filtered and dried.

5.5 g. of a brick-red solid, insoluble in methanol and ethanol and soluble in benzene, acetone and petroleum ether, were obtained.

The product was found to contain 7.6% nickel (calculated for $C_{38}H_{62}N_2O_2SNi=8.7\%$).

1 g. of the above produced nickel derivative of 2,2'-thiobis(4 - tert.octyl-6-diethylaminomethyl)phenol were mixed in a ball mill with 99 g. of polypropylene having a specific viscosity [η] of 1.42, a residue after heptane extraction of 97% and an ash content of 0.012%.

The mix was then spun at 250° C. with a laboratory device consisting of a heated cylinder, piston and spinneret with 4 holes having a ratio φ/length of 0.8 mm./16 mm. Intense solid colors were obtained by dyeing these fibers with the following dyestuffs:

Violet polypropylene 3 BRM
Orange olefin 2532
Red Aizen 3 BL
Violet Aizen RL
Yellow Daito HRK

EXAMPLE 3

44 g. (0.1 mol) of 2,2'-thiobis (4-tert.octyl)phenol were dissolved in 100 cc. of warm ethanol having a temperature from about 40 to about 70° C. After cooling to room temperature, 32.3 g. (0.25 mol) of di-n.butylamine and then 40 g. of a 40% formaldehyde solution were added. The reaction mixture was refluxed for 5 hours and then evaporated under vacuum to obtain a dry residue.

To 2.8 g. of the residue, 0.93 g. of zinc acetate dihydrate and 100 cc. of xylene were added. The mixture was heated at 120–125° C. until no more acetic acid was distilled off.

After complete evaporation, the solid residue was carefully washed with methanol, filtered and dried.

3 g. of an ivory-white solid, insoluble in methanol and acetone and soluble in n-heptane, ethylether, petroleum ether and xylene, were obtained.

The product was found to contain 6.75% of zinc. (Calculated for $C_{46}H_{78}N_2O_2SZn=8.30\%$.

1 g. of the zinc derivative of 2,2'-thiobis(4 - tert. octyl-6-dibutylaminomethyl)phenol were mixed in a ball mill with 99 g. of polypropylene having a specific viscosity [η] of 1.8, a residue after heptane extraction of 96.5% and an ash content of 0.013%. The mix was then spun at 280° C. with a laboratory device consisting of a heated cylinder, piston and a spinneret with 4 holes having a ratio φ/length of 0.8 mm./16 mm. Intense solid colors were obtained by dyeing the fibers with the following dyestuffs:

Violet polypropylene 3 BRM
Orange olefin 2532
Red Aizen 3 BL
Violet Aizen RL
Yellow Daito HRK

EXAMPLE 4

A series of mixes consisting of polypropylene (having a melt index of 4) and of (A) metal derivatives used in prior art proposals (tests a–c and (B) metal complexes in accordance with the present invention (tests d and e) was prepared. The metal derivatives were added to the polypropylene in such amount as to obtain 0.1% of metal in the composition.

From each mix 3 laminae having a thickness of 1 mm. were prepared in a Carver press, the first by melting the mix in a press at 280° C., the second after keeping the mix in the press for 15 minutes at 280° C. and the third after keeping the mix in the press for 15 minutes at 300° C.

In the following table there are reported the melt indexes of the laminae. From a comparison of the data it can be seen that the compositions containing the metal derivatives of the present invention (tests d and e) are substantially more resistant to thermal treatments than those containing the metal derivatives known from the art (tests a, b and c).

| Metal Derivative | Melt Index | | |
|---|---|---|---|
| | 280° C., 0 min. (1) | 280° C., 15 min. (2) | 300° C., 15 min. (3) |
| (a) Nickel derivative of 2,2'-thiobis(4-tert.octyl)phenol (old) | 4.9 | 276 | ¹ n.d. |
| (b) Cadmium derivative of 2,2'-thiobis(4-tert.octyl)phenol (old) | 5.4 | | ¹ n.d. |
| (c) Zinc derivative of 2,2'-thiobis(4-tert.octyl)phenol (old) | 6.9 | 277 | ¹ n.d. |
| (d) Nickel derivative of 2,2'-thiobis(4-tert.octyl-6-diethylaminomethyl)phenol (Ex. 2) | 4 | 6.3 | 33 |
| (e) Zinc derivative of 2,2'-thiobis(4-tert.octyl-6-diethylaminomethyl)phenol Ex. 1) | 4.5 | 14.4 | 81.6 |

¹ Not determinable because too high (>800).

Variations, can, of course, be made without departing from the spirit and scope of the invention.

Having thus described my invention, what I desire to secure by Letters Patent and hereby claim is:

1. A polyolefin composition having good dyeability and fastness with dispersed dyestuffs and chelating dyestuffs comprising a crystalline polyolefin having the formula R–CH=CH₂, wherein R is H or an alkyl or aryl radical, and an additive which renders said polyolefin dye receptive, said additive comprising 0.1–10% by weight of the composition and being a metal complex of a Mannich base, said complex having been prepared by reacting a Mannich base of a phenol sulfide having the general formula:

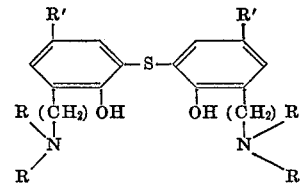

wherein R is an alkyl radical having 1–8 carbon atoms and R' is an alkyl radical having 1–12 carbon atoms or a hydrogen atom, with a salt of a metal selected from the group consisting of zinc, cadmium, iron, nickel, cobalt, chromium, copper, tin, strontium and titanium.

2. A process for improving the dye receptivity of a crystalline polyolefin having the formula R—CH=CH$_2$, wherein R is H or an alkyl or aryl radical, which comprises adding thereto 0.1–10% by weight of the total mixture of a metal complex of a Mannich base, said complex having been prepared by reacting a Mannich base of a phenol sulfide having the general formula:

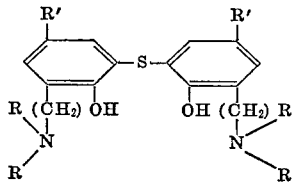

wherein R is an alkyl radical having 1–8 carbon atoms and R' is an alkyl radical having 1–12 carbon atoms or a hydrogen atom, with a salt of a metal selected from the group consisting of zinc, cadmium, iron, nickel, cobalt, chromium, copper, tin, strontium and titanium.

3. The composition of claim 1 wherein said Mannich base is 2,2'-thiobis(4-tert.octyl - 6-dimethylaminomethyl)-phenol or 2,2'-thiobis(4-tert.octyl-6-dibutylaminomethyl)-phenol.

4. The composition of claim 1 wherein said metal is zinc or nickel.

5. The composition of claim 1 wherein polyolefin is polypropylene having a prevailingly isotactic structure.

6. The composition of claim 1 in the form of textile fibers or films.

References Cited

UNITED STATES PATENTS 3,374,215   3/1968   Cappuccio et al. _____ 260—94.9

JAMES A. SEIDLECK, Primary Examiner

U.S. Cl. X.L.

8—55; 260—93.5, 94.9

UNITED STATES PATENT OFFICE
CERTIFICATE OF CORRECTION

Patent No. 3,475,400          Dated October 28, 1969

Inventor(s) LUCIANO TAVOLETTI

It is certified that error appears in the above-identified patent and that said Letters Patent are hereby corrected as shown below:

Column 1, second structural formula,

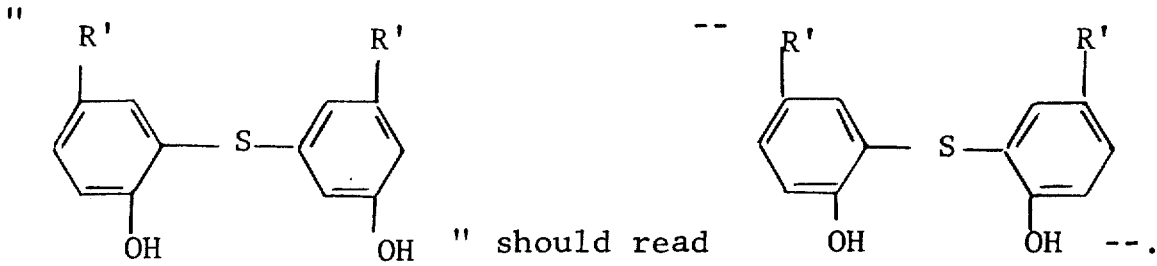

Column 3, line 32, "dimentional" should read -- dimensional --; line 65, "carfully" should read -- carefully --; line 69, "of a 10% of a" should read -- of a 10% --; line 70, "producet" should read -- product --. Column 4, line 25, "1.50" should read -- 1:50 --. Column 5, line 73, "=8.30%." should read -- =8.30%). --. Column 6, line 49, "Ex. 1)" should read -- (Ex. 1) -- . Column 8, claim 3, line 4 "-6-dimethylaminomethyl)-" should read --  -6-diethylaminomethyl)- --.

SIGNED AND
SEALED
JUN 2 1970

(SEAL)
Attest:

Edward M. Fletcher, Jr.
Attesting Officer

WILLIAM E. SCHUYLER, JR.
Commissioner of Patents